United States Patent [19]

Kakuma et al.

[11] Patent Number: 5,070,498
[45] Date of Patent: Dec. 3, 1991

[54] CALL CONTROL SYSTEM IN ATM SWITCH

[75] Inventors: Satoshi Kakuma; Atsuhisa Takahashi; Yoshihiro Uchida, all of Kawasaki, Japan

[73] Assignee: Fujitsu Limited, Kawasaki, Japan

[21] Appl. No.: 563,210

[22] Filed: Aug. 6, 1990

[30] Foreign Application Priority Data

Aug. 4, 1989 [JP] Japan .................................. 1-201444

[51] Int. Cl.⁵ .......................................... H04Q 11/04
[52] U.S. Cl. ..................................... 370/60; 370/94.1
[58] Field of Search ....................... 370/60, 60.1, 94.1, 370/94.2, 94.3, 58.1, 58.2, 58.3, 110.1

[56] References Cited

U.S. PATENT DOCUMENTS 4,956,839 9/1990 Torii et al. .......................... 370/94.1
4,984,264 1/1991 Katsube ................................ 370/60

Primary Examiner—Douglas W. Olms
Assistant Examiner—Wellington Chin
Attorney, Agent, or Firm—Staas & Halsey

[57] ABSTRACT

Disclosed is a call control method for use with an ATM switch for integrating and switching various types of information which differ in traffic characteristics, such as voice, data and motion images, using an asynchronous transmission mode (ATM). When a call is made to the ATM switch, it is accepted only when it is possible to set a path that can guarantee the service requested by the call. When a call is made to the ATM switch, a load representing how much of the capacity of input links and output links of a self-routing module (SRM) constituting the ATM switch is obtained from the average value and peak value of the bit rate of the call. The load is added to each of current loads of the input and output links and buffers of the self-routing module which form a path in the ATM switch. A determination is made as to whether or not the result of the addition exceeds the maximum load of each of the input and output links and buffers. On determination that the maximum value is not exceeded, the call is accepted.

20 Claims, 11 Drawing Sheets

| INPUT LINK | | OUTPUT LINK | | BUFFER LOAD |  |  |  |
|---|---|---|---|---|---|---|---|
| 0 | 0.7 | 0 | 0.4 |     | 0.5 |     |     |
| 1 | 0.6 | 1 | 0.7 | 0.2 |     | 0.3 |     |
| 2 | 0.2 | 2 | 0.5 |     |     | 0.3 |     |
| 3 | 0.5 | 3 | 0.4 |     | 0.2 |     |     |
|   |     |   |     |     |     |     | 0.1 |
|   |     |   |     |     |     |     | 0.4 |

(Note: buffer load table has 4 rows × 4 columns)

| Buffer Load | col0 | col1 | col2 | col3 |
|---|---|---|---|---|
| row 0 |      | 0.5  |      |      |
| row 1 | 0.2  |      | 0.3  |      |
| row 2 |      |      | 0.3  | 0.1  |
| row 3 |      | 0.2  |      | 0.4  |

Fig. 14

| INPUT LINK | | OUTPUT LINK | |
|---|---|---|---|
| 0 | 0.7  | 0 | 0.4  |
| 1 | 0.95 | 1 | 0.7  |
| 2 | 0.2  | 2 | 0.85 |
| 3 | 0.5  | 3 | 0.4  |

| Buffer Load | col0 | col1 | col2 | col3 |
|---|---|---|---|---|
| row 0 |      | 0.5  |      |      |
| row 1 | 0.2  |      | 0.65 | 0.3  |
| row 2 |      |      | 0.2  |      |
| row 3 |      |      |      | 0.4  |
| row (extra) |   |      |      | 0.1  |

CALL CONTROL SYSTEM IN ATM SWITCH

BACKGROUND OF THE INVENTION

The present invention relates to a call control system in a network and, more particularly, to a call control system in an ATM switch for integrating and switching various types of information differing in traffic characteristics, such as voice, data and motion pictures, using such an asynchronous transmission mode (ATM) as in an integrated services digital network (ISDN).

With recent wide use of data communications, not only conventional voice but also important data is communicated using public switched lines. In future communications networks, therefore, high-quality transmission and switching of data are required. As a communication services network for providing not only voice and low-speed data but also high-speed data such as motion images, the broadband ISDN (B-ISDN) has entered the stage of practical application and various types of interfaces have been standardized. As opposed to conventional switching systems, the B-ISDN can equally handle information of different speeds, such as voice, low-speed data and motion images, and can also handle continuous information and burst information.

In such ATM communications the same call control method must be used for calls of different traffic characteristics. In the ATM communications, however, the transmission of channels used for communications is not periodic depending on the contents of services and the number of transmitted channels per unit time is not uniform. Thus, there is an uncertain aspect that the quality cannot be fully guaranteed even to a call connected once. In order to eliminate the uncertain aspect and control the transmission of information of different traffic characteristics with the same procedure, there is, in the ATM communications, a desire for a call control system which is distinct from that in the conventional line switching system.

In the ATM network, information of different bands is transmitted and switched in units of a fixed length which are called cells in order to be distinguishable from the conventional packet switching system. Since line data and packet data are multiplexed in cell units without distinction therebetween, the ATM network can accommodate services requiring different transmission rates with flexibility, thus permitting transmission lines to be utilized efficiently.

FIG. 1 is a conceptual diagram of communications in the ATM network. User information is divided into several cells according to its length with a header added to each cell. As an example, the header of a cell is several bytes in length and its data part is about 32 to 120 bytes in length. The header has a channel identifier, which is called a VCI, so as to identify the user that transmits the information. After being divided into cells, the user information is multiplexed on the ATM highway for transmission and switching. This switching is called self-routing because, in the ATM switching device of the network, a buffer into which the cell data is to be written is designated by a processor in the switching device using a channel number and the cell data autonomously flows through the network in accordance with the designation of the buffer. On the receiving side the required cells are extracted from the ATM highway on the basis of the channel identifier (VCI) and the header is removed to reproduce the user information.

Distinct from a conventional synchronous transmission mode (STM), the ATM system permits the same user's information to be transmitted asynchronously on the ATM highway as shown in FIG. 1. The ATM system permits voice transmit data, whose delay is not allowed, to be inserted between data in, for example, data services in which some answer waiting time is allowed.

The services performed by the ATM network includes the transmission of voice, data and motion images. The characteristic of each service and the functions required of each service will be described below.

(1) The voice service

The information transmitted in the voice service is transmitted at a low speed and continuously in the voice service as compared to other services. The voice service is strict in delay conditions.

(2) The data service

When data is discarded in the data service, a process of retransmission is performed. The retransmission increases the amount of information. Thus, the conditions for discarding information are strict. The amount of information is not uniform per unit time. On the other hand, the data service is not strict with delay time as compared with the voice service.

(3) The motion image service

In the motion image service, the amount of the information is not uniform per unit time in the same manner as in the data service and the delay conditions are strict in the same manner as in the voice service.

Since the ATM network integrates and handles those services, the characteristics of each service will be expressed in bandwidth of information. The bandwidth of information is expressed in terms of its average value and its peak value taking configurations (continuous, burst) of the services into consideration. For this reason, the ATM switch is required to have functions of not only switching of average values of information but also switching of peak values of information.

To satisfy the conditions required of each service, the following conditions are taken into considerations.

Discard conditions: For information which is strict with discard conditions, the peak value of the bandwidths of information is more significant than its average.

Delay conditions: Information which is strict with delay conditions needs a margin of an average of bandwidths.

That is, to offer each service with high quality in the ATM switch, adequate consideration must be given to the average and the peak value of information bandwidths for switching according to the contents of the services in the ATM network.

In call control, determination should be made as to whether a call can be accepted or not when the call is made. Furthermore, the ATM network, unlike the STM network, is required to guarantee transmission quality even to a call accepted once because the amount of information varies.

For this reason, the call control requires the following functions:

(1) When a call is made, determination is made as to whether or not the setting of a path which can guarantee a service that the call requires is possible. If not possible, the acceptance of the call is not allowed.

(2) The service of a call accepted once is guaranteed.

To implement those functions, the AIM switch requires the following processes:

(1) Recognizing of the status of the ATM switch in order to set a path which can guarantee the service that a call requires when it is made, and (2) Recognizing of the configuration of information and performing of switching operation according to the configuration in order to guarantee the service of a call accepted once.

For this reason, it is required that, in the call control of the ATM switch, variations in information can be processed by the same procedure according to its configuration and moreover the status of the switch can always be recognized.

In the ATM switch, switching is made by the self-routing system as described above. A module used for the self-routing switching is called a self-routing module (SRM). The self-routing module is adapted for switching between a plurality of its incoming lines and outgoing lines. The switching is made in such a manner that a buffer is placed at each of intersections of the incoming lines and outgoing lines, data is stored in the buffer according to the channel identifier (VCI) described above, and the data is output onto a corresponding outgoing line. Thus, the call control should be performed according to the amount of use o f a buffer placed at each of intersections of the incoming lines and outgoing lines. However, the amount of use of the buffer varies greatly with configurations of information, and a variation in amount of use of the buffer with respect to call control processing time becomes large because broadband information is switched. It is therefore difficult to recognize the status of the switch in accordance with the amount of use of the buffers. That is, in the case where the amount of use of each buffer is collected and then a path is set for a call in accordance with the collected state of the buffers, the amount of use of each buffer would already have been varied when the path was set. Data would have overflowed part of buffers and the data would have been discarded.

SUMMARY OF THE INVENTION

An object of the present invention is to, when a path is set for a call in an ATM switch, obtain a load representing the extent of capacity of a path used for the call in a link of the switch, for example, a ratio of an amount of data transfer to a capacity of the link in which the transfer is possible, namely, a ratio in which the link is exclusively occupied, and to control calls for services of different characteristics in accordance with the same procedure using the load.

A feature of the present invention resides in an ATM switch which is used in an asynchronous transmission mode (ATM) digital network for providing various services including voice, data communications and motion images and comprises a plurality of self-routing modules each comprising a plurality of input links, a plurality of output links and buffers placed at respective intersections of the input links and the output links for storing ATM cells. A call control method of the present invention comprises the steps of obtaining, when a call is made to the ATM switch, a load representing how much of the capacity of the input and output links of the self-routing modules is used by the call from the average value and peak value of the bandwidth of the call, adding the load to each of current load values of input links, output links and buffers of the self-routing modules which form a path set for the call in the ATM switch, making a determination of whether or not each of the results of the addition exceeds a maximum value of the input links, the output links and the buffers forming the path, and accepting the call when the maximum is not exceeded as a result of the determination.

BRIEF DESCRIPTION OF THE DRAWINGS

FIG. 12 illustrates the contents of the call control table for a call;

FIG. 13 illustrates the contents of the call control table when a plurality of calls are accepted; and FIG. 14 illustrates the contents of the call control table for explaining the acceptance of a new call.

DESCRIPTION OF THE PREFERRED EMBODIMENTS

Figure 1:
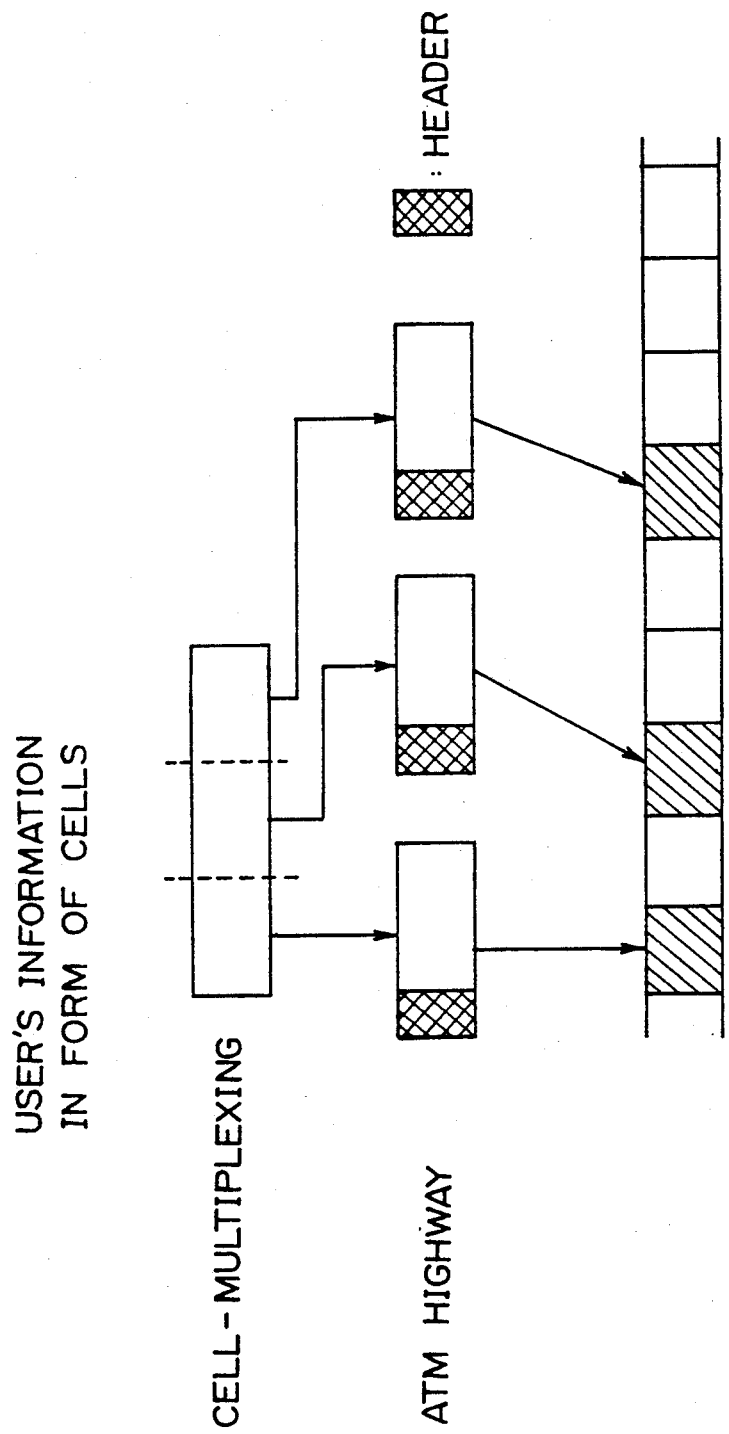
FIG. 1 is a conceptual diagram illustrating communications in an ATM network.
Figure 2:
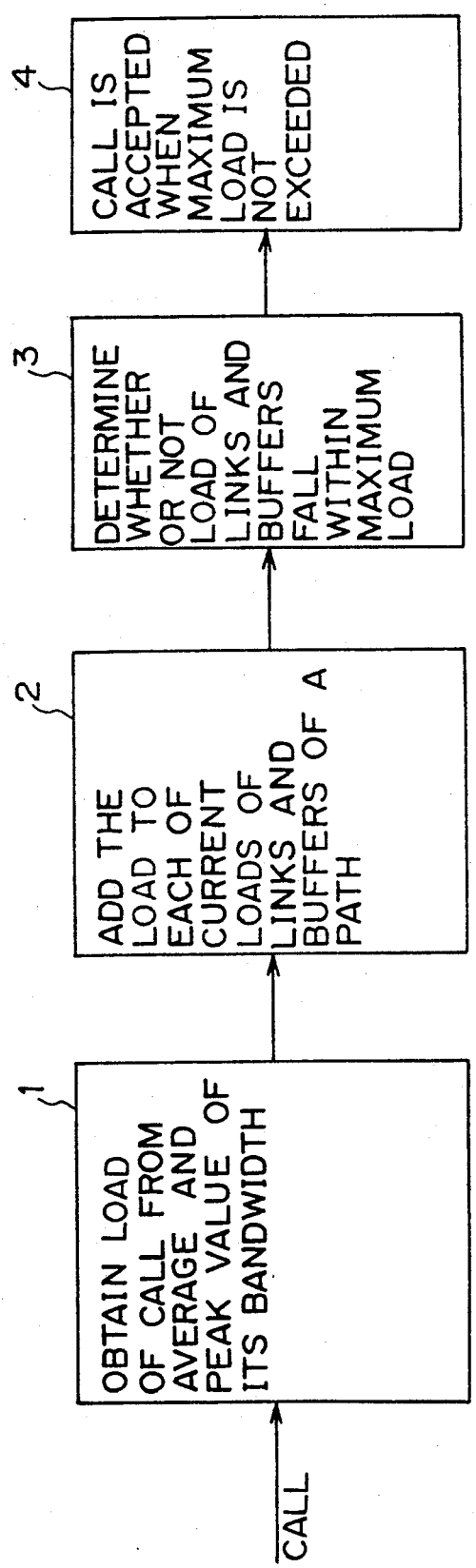
FIG. 2 is a functional block diagram of the present invention.

FIG. 2 is a functional block diagram of the present invention. More specifically, FIG. 2 is a functional block diagram of a call control system in an ATM switch in an asynchronous transmission mode (ATM) digital network which offers various types of services including voice, data communications and motion pictures.

The ATM switch is equipped with a plurality of self-routing modules each comprised of a plurality of input links, a plurality of output links and buffers for storing ATM cells at intersections of the input links and output links.

When a call is made to the ATM switch, a load representing to what extent the call uses the capacity of the input links and output links of the self-routing modules in the ATM switch is obtained from the average and peak value of the bandwidth of the call at 1 in FIG. 2.

Next, at 2, the obtained load corresponding to the call is added to each of current load value of an input link and output link of the self-routing modules constituting a path set in the ATM switch for the call, and that of each buffer provided at a point of an intersection between the input and output links, that is, load values representing to what extent the link capacity has already been used. Then, at 3, determination is made as to whether or not each of the results of the addition exceeds each of maximum loads for the input link, the output link and the buffer constituting the path to be set. As a result of the determination, when each of the maximum loads is not exceeded, the call is accepted at 4.

As described above, in the present invention, when a call is made, a load indicating the extent of the capacity of input and output links of the self-routing module in the switch which are used by the call is obtained to perform call control. The load is set according to the information type of the call and signals of different information types are handled by the same system.

Figure 3:
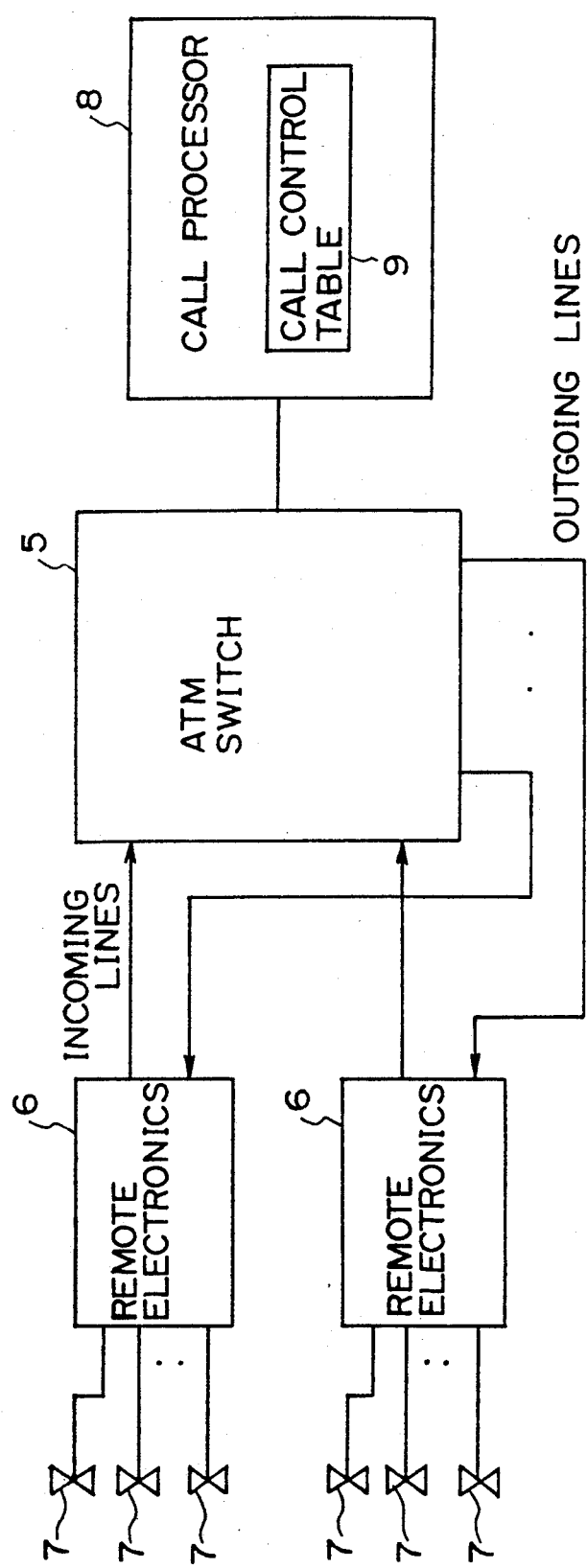
FIG. 3 is a block diagram illustrating an entire configuration of an embodiment of a digital switched network including an ATM switch.

FIG. 3 is a block diagram of an entire digital switched network including an ATM switch using a call control method according to the present invention. In the Figure, the ATM switch 5 has a plurality of incoming lines and a plurality of outgoing lines. A plurality of telephone terminals 7 are connected to an incoming line and an outgoing line via a remote electronics, for example, a concentrator 6. The switching of the ATM switch 5 is made by a call processor 8 which includes a call control table 9 into which loads that are currently being added to links and buffers in the ATM switch 5 are written.

Figure 4:
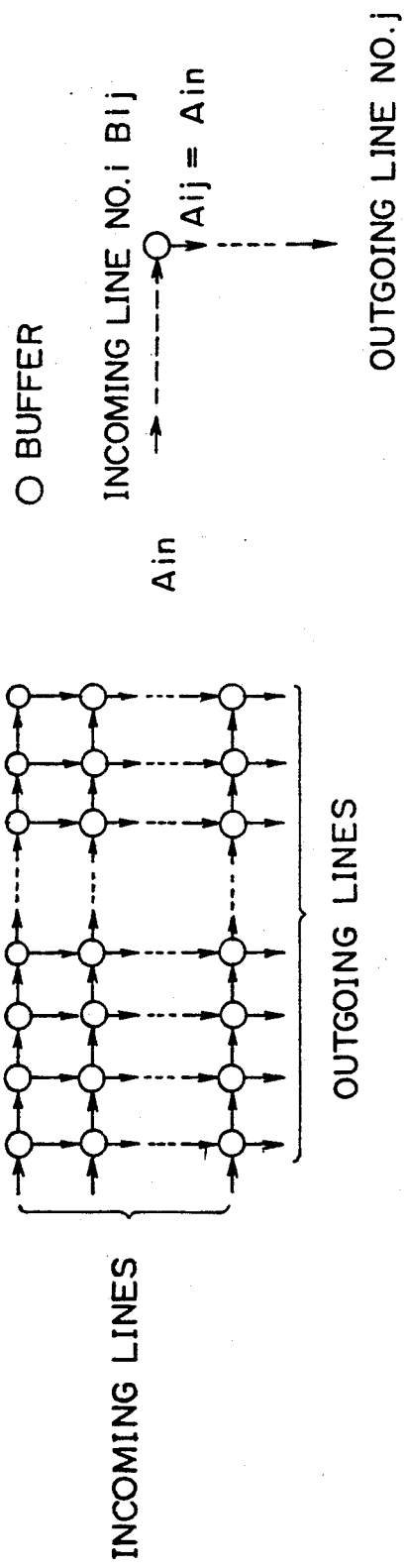
FIG. 4 is a conceptual diagram of the configuration of a self-routing module (SRM)

The ATM switch 5 is generally configured such that a plurality of such self-routing modules (SRM) as described above are connected in cascade. FIG. 4 is a conceptual diagram of the self-routing module (SRM). The SRM has n incoming lines and n outgoing lines and the buffer placed at the intersection of the incoming line No. i and the output line No. j is represented by $B_{ij}$. It is assumed that a load of the buffer $B_{ij}$ is represented by $A_{ij}$, and it is also assumed that, generally speaking, a load of an incoming line is represented by $A_{in}$ and a load of an outgoing line is represented by $A_o$. When a call that has been accepted is on the incoming line No. i, the outgoing line No. j is set as an outgoing line and a load of the call is $A_{in}$, the load $A_{ij}$ of the buffer $B_{ij}$ is $A_{in}$.

When a plurality of calls are set to the SRM, the loads of the buffers and the links are summed. That is, when a plurality of calls (p in number) are on the incoming line No. i, the load of its link is given by $$A_{ini} = \sum_{l=1}^{p} A_{inl} \tag{1}$$

Similarly, when a plurality of calls (q in number) are on the outgoing line No. j, the load $A_{oj}$ of its link is given by $$A_{oj} = \sum_{l=1}^{q} A_{ojl} \tag{2}$$

Figure 5:
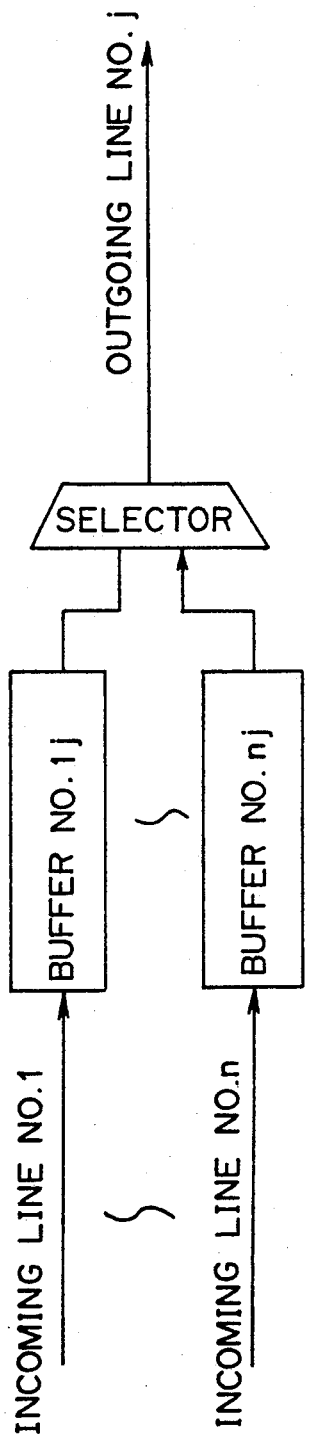
FIG. 5 illustrates a configuration of an intersection of incoming and outgoing lines in the self-routing module (SRM)

The load $A_{oj}$ of the outgoing line No. j becomes a sum of loads of buffers connected to the outgoing line No. j as illustrated by the configuration of an intersection of links in the SRM in FIG. 5. That is, $$A_{oj} = \sum_{i=1}^{n} A_{ij} \tag{3}$$

In the call control of the ATM switch, a table of load values for links and buffers constituting the switch, i.e., a call control table is prepared. When a call is set, load values obtained for the call are written into the positions corresponding to respective links and buffers forming a path set for the call, within the call control table the table in accordance with a load value of the call and a set path.

When a call is made, the load value of the call is estimated for call control. A determination of whether or not a path can be set is made on the basis of the load value and the contents of the table. If the path cannot be set, the call is not accepted, and if the setting of the path is possible, the path is set and the load value is added to the table.

When the call is released, the path is released and the load value of the call is subtracted from the table.

The amounts of use of buffers in the switch are read regularly (at long intervals) for comparison with the load values in the table. This permits the setting of calls and the guarantee of path quality without always recognizing the amounts of use of buffers in the switch.

As described above the ATM network is required to switch various types of information. In the ATM network, various types of information are divided into information elements of a fixed length, called cells, for switching and transmission and handled equally without distinguishing one from the other. Broadband information has many cells to be processed within a unit time, while narrow band information has few cells.

The calculation of loads is performed on the basis of the number of cells which can be processed within a unit time and thus strongly affected by the bandwidth of information. As described above, the bandwidth is given by average and peak values depending on the types of information. Naturally, the load is proportional to an average value ($BW_{av}$) of bandwidths of information. To guarantee the quality of information communications, it is required that an exchange of peak values ($BW_p$) be accepted. Since the simple use of peak values considerably deteriorates the efficiency, conditions depending on the configuration of the switch and types of information should be considered.

That is, a load A can be expressed as a sum of a time-independent term that depends on the average ($N_{av}$) of bit rates of information representing bandwidths of the information after digitization and a time-varying term depending on a peak value ($N_p$).

$$A = P(N_{av}) + Q(N_p) \tag{4}$$

The term depending on the average ($N_{av}$) of information bit rates is proportional to the average ($N_{av}$) and thus given by $$P(N_{av}) = K_1 \cdot N_{av} \tag{5}$$

Assuming that the term depending on the peak value is given by a difference between the average value and the peak value, to represent a possible variation of the peak value which can be permitted with regard to the average value, it is given, as a function of $N_{av}$ and $N_p$, by $$Q(N_p) = f(N_{av} - N_p) \tag{6}$$

In equations (4), (5) and (6) the conditions depending on the switch configuration and the difference in information type are not taken into considerations. The conditions depending on the difference in information type include discard and delay conditions as described previously. For information which is strict with delay conditions, in order to decrease calls passing through buffers included in a path set for a call for the information, it is necessary that the apparent load be increased. This exerts an influence upon both the average-dependent term and the peak-dependent term. That is, the load to which the delay conditions are added is given by $$A_t = A \cdot K_2 = K_2 \cdot [P(N_{av}) + Q(N_p)] \tag{7}$$

The discard conditions are determined by the size of the buffers in the switch and the peak of information. The load has an influence on the peak-dependent term. That is, by making variations appear to be large to make allowance for buffers, it is possible to prevent information from being discarded. For this reason, the load Q1 to which the discard conditions are added is given by $$Q1(N_p) = K_3 \cdot f(N_{av} - N_p) \tag{8}$$

From the foregoing the calculation of a load for each information is performed in accordance with the following equation given by $$A_{total} = K_2 \cdot [P(N_{av}) + Q1(N_p)] \tag{9}$$
$$= K_2 \cdot [K_1 \cdot N_{av} + K_3 \cdot f(N_{av} - N_p)]$$

Depending on information, priority may be required. The priority can be implemented by decreasing delay in the switch. Thus, by making the coefficient $K_2$ associated with the delay conditions large, the call control can be performed.

The calculation of a load for each type of information is performed by equation (9) in which the following coefficients are used:
- $K_1$ = a load coefficient depending on the bandwidth of information;
- $K_2$ = a coefficient depending on the delay conditions;
- $K_3$ = a coefficient depending on the discard conditions; and
- $f(x)$ = a load coefficient depending on variations in information. How those coefficients are given according to types of information will be described next.

(1) Continuous information

Assuming the rate of the link No. i of the ATM switch to be $N_i$ (bits/second) and the cell length to be $n_c$ bits, the cell speed on the link, that is, the number $n_i$ of cells transmitted every second is given by $$n_i = N_i / n_c \text{ (cell/second)} \tag{10}$$

When data is continuously transmitted at a rate of $N_a$ (bits/second), the number $N_a$ of cells to be transmitted a second is given by $$n_a = N_a / n_c \text{ (cell/second)} \tag{11}$$

A rate $K_p$ at which the links of the ATM switch are occupied is given by $$K_p = n_a / n_i \tag{12}$$

A load coefficient $K_1$ of links and buffers which is dependent on the bandwidth of information is given as quantity associated with $K_p$.

That is, a load $A_a$ for a call when continuous information is transmitted at $N_a$ (bits/second) is given, as being equal to the link-occupation rate, by $$A_a = n_a / n_i = N_a / (n_c \cdot n_i) \tag{13}$$

Here, $P(N_{av})$ in equation (4) can be represented by the load $A_a$ for a call when continuous information is transmitted at $N_a$ (bits/second) and thus is given by $$P(N_{av}) = A_a = N_a / (n_c \cdot n_i) \tag{14}$$

Since the transmission rate of information is $N_a$, the load coefficient $K_1$ depending on the bandwidth of information is given by $$K_1 = 1 / (n_c \cdot n_i) \tag{15}$$

When a path is set in the ATM switch, the SRM sets a path for connecting the incoming line No. i to the outgoing line No. j so that a load of $A_{ij}$ is applied to the buffer $B_{ij}$ placed at the intersection of the incoming line No. i and the outgoing line No. j.

The load $A_{ij}$ of the buffer $B_{ij}$ at the intersection of the incoming line No. i and the outgoing line No. j is represented by a sum of loads of calls passing through the buffer.

That is, in the case of continuous information, the buffer load is obtained as a sum of loads of calls passing through the buffer independently of the buffer length indicating the number of cells which can be stored in the buffer. In the case of burst information as well, since information is handled as if it was continuous information for load process, the load is set independently of the buffer length.

That the buffer load becomes "1" indicates that calls cannot be set any further because the occupation rate of the buffer as continuous information is 100 % and that data variations in burst information are absorbed by buffer length. Assuming that a buffer is 16 cells in length, when input cells increase in number due to the burst nature of burst information in the state in which the buffer load is "1", the buffer can accommodate up to 16 cells.

The number $n_{iij}$ of cells entered into a buffer $B_{ij}$ for a second is given by $$n_{iij} = A_{ij} \cdot n_i \tag{16}$$

That is, the sum of loads for p calls passing through buffer $B_{ij}$ is given by $$\sum_{m=1}^{p} \frac{n_{am}}{n_i} = \frac{1}{n_i} \sum_{m=1}^{p} n_{am} = \frac{n_{iij}}{n_i}$$

This agrees with the load $A_{ij}$ of the buffer $B_{ij}$

On the other hand, assuming the bit rate of outgoing line No. j to be $N_j$ (bits/second), the maximum number $n_j$ of cells which are output from the outgoing line No. j for a second is given by $$n_j = N_j / n_c \tag{17}$$

Assuming that the selector associated with the outgoing line No. j sequentially selects the incoming lines, one at a time, starting with the incoming line No. 1 and skips over buffer $B_{ij}$ when it contains no data, the number of cells which are output from a buffer $B_{ij}$ associated with the outgoing line No. j for a second is given by the following equation. That is, the number of cells that the buffer $B_{ij}$ outputs is given by the product of the ratio of the load of the buffer to the sum of loads of all the buffers associated with the outgoing line No. j and $n_j$.

$$n_{oij} = A_{ij} \cdot n_j / \sum_{i=1}^{n} A_{ij} \tag{18}$$

The following conditions are required in order not to discard cells.

$$n_{oij} \geq n_{ij} \tag{19}$$

Substituting equations (16) and (18) into equation (19) yields $$\sum_{i=1}^{n} A_{ij} \leq n_j / n_i \tag{20}$$

For continuous information, the loads of links and buffers and cell discard conditions are as follows:

(1) the load $A_a$ for a call a is represented by equation (14);
(2) the load $A_i$ for a link No. i is represented by the sum of loads of calls which are present in links;
(3) the load $A_{ij}$ for buffer $B_{ij}$ is represented by a sum of loads of calls switched at intersections of links of SRM; and
(4) the condition expressed by equation (20) is required in order not to discard cells.

(2) Burst information

Considering information having the average value Na (bits/second) of bit rates and a peak value of $N_p$ (bits/second) in cells/second, the cell transfer rate $n_{abt}$ at a time t is given by $$n_{abt} = n_a + (n_p - n_a) g(t) \tag{21}$$

Since the first term is a fixed value and the second term is a variable value, the first term is related to $P(N_{av})$ and the second term is related to $Q(N_p)$ from equation (4). That is, in equation (21), assuming the cell length of an ATM cell to be $n_c$, $n_a$ is the ratio of $N_a$ and $n_c$ and $n_p$ is the ratio of $N_p$ and $n_c$.

A function of g(t) in equation (21) represents the burst nature of burst information and the burst nature results from a method of compressing motion images, for example, and is determined by terminals connected to the network. In the present invention, therefore, the form of g(t) is not established.

Taking the average value $N_a$ (bits/second) only into consideration, cells may be discarded by the second term in equation (21). For this reason, the load $A_{ij}$ of the buffer $B_{ij}$ is compensated. Assuming that the load depending to the average value is $A_{ijm}$ and the compensated load depending on the variable value is $A_{ijd}$, the load $A_{ij}$ of the buffer $B_{ij}$ is given by $$A_{ij} = A_{ijm} + A_{ijd} \tag{22}$$

From equation (13) $A_{ijm}$ is given by $$A_{ijm} = n_a / n_i \tag{23}$$

At this time, the number $n_{oij}$ of outgoing cells of the buffer, like equation (18), is given by $$n_{oij} = (A_{ijm} + A_{ijd}) \cdot n_j / \sum_{i=1}^{n} A_{ij} \tag{24}$$

The number $n_{iij}$ of incoming cells of the buffer is $n_{abt}$. Assuming the buffer length, that is, the number of cells that the buffer can accommodate to be $n_b$, the following condition is required in order not to discard cells.

$$n_{iij} - n_{oij} \leq n_b \tag{25}$$

Substituting equations (21) and (24) into equation (25) yields $$n_a + (n_p - n_a)g(t) - (A_{ijm} + A_{ijd}) \cdot n_j / \sum_{i=1}^{n} A_{ij} \leq n_b \tag{26}$$

Substituting $n_a = n_i A_{ijm}$ resulting from a change of equation (23) into equation (26) yields $$n_i \cdot A_{ijm} - A_{ijm} \cdot n_j / \sum_{i=1}^{n} A_{ij} + \tag{27}$$

$$(n_p - n_a)g(t) - A_{ijd} \cdot n_j / \sum_{i=1}^{n} A_{ij} \leq n_b$$

Here, the maximum value of $$\sum_{i=1}^{n} A_{ij}$$

becomes $n_j / n_i$ from equation (20) in order not to discard cells. Substituting this into equation (27) yields the following equation. The reason for substituting the maximum value is that $$\sum_{i=1}^{n} A_{ij}$$

is present in the denominator of the fourth term in the left side of equation (27) and moreover the sign of the fourth term is negative.

$$(n_p - n_a)g(t), -A_{ijd} \cdot n_i \leq n_b \tag{28}$$

Changing equation (28) yields $$A_{ijd} \geq \left( \frac{n_p}{n_i} - \frac{n_a}{n_i} \right) g(t) - \frac{n_b}{n_i} \tag{29}$$

Here the following loads are defined.
The peak load $A_{ijp} = n_p / n_i$
The allowable load of buffer $A_{ijb} = n_b / n_i$
Equation (29) becomes $$A_{ijd} \geq (A_{ijp} - A_{ijm})g(t) - A_{ijb} \tag{30}$$

From the foregoing, the average load $A_{ijm}$ of burst information is calculated from its average value of the bit rate of the information and the load of burst information is calculated by the sum of the average load and the compensated load $A_{ijd}$. The compensated load is calculated in accordance with equation (30). When a plurality of pieces of burst information are allocated to the same buffer, it is necessary only that $A_{ijm}$ and $A_{ijd}$ be added to the plurality of pieces of burst information together using equations (22) and (30). The buffer allowable load which is the second term on the right side of equation (30) is not common to a plurality of burst calls and thus it cannot be added. For this reason, the following equation is used for a plurality of burst calls.

$$A_{ij} = \sum_{a=1}^{p} A_{ijma} + \sum_{a=1}^{p} (A_{ijpa} - A_{ijma})g(t) - A_{ijb} \quad (31)$$

By using equation (31) it is possible to calculate the load of burst information and handle it in the same manner as continuous information. The first term on the right side of equation (31) stands for the sum of average loads for a plurality of calls (p in number) and the second term stands for the sum of products of the compensated load as a difference between the peak load and the average load and g(t).

The load function f(x) depending on variations in information in equation (9) is given, using equation (31), in the form of $$\sum_{a=1}^{p} f(x) = \sum_{a=1}^{p} (A_{ijpa} + A_{ijma})g(t) - A_{ijb} \quad (32)$$

As described above, in the present invention, the call control is performed uniformly on the basis of an idea that how much of capacity of links in a path set for a call is used is estimated using the concept of load without distinction between continuous information and burst information.

Figure 6:
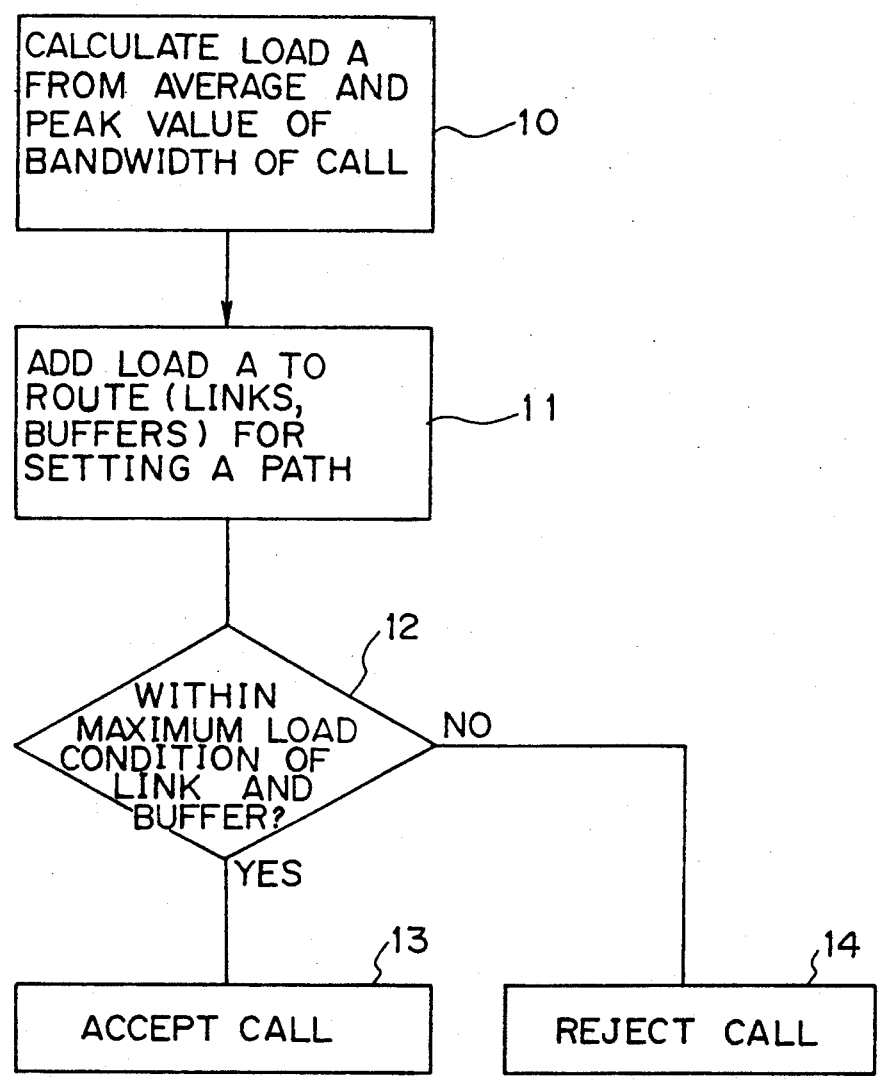
FIG. 6 is a flowchart of a process of determining the acceptance of a call.

FIG. 6 is a flowchart of the call-acceptance determining process in the call control system of the present invention. As shown, a load A is calculated from the average value and peak value of bandwidth of a call made to the switch in step 10. The average value and peak value of a call are obtained by causing the user of the call to apply for the type of information used in the call when a line is provided at the user and the average value and peak value of the bandwidth of the call are known the instant the call is made.

Next, in step 11, the load A calculated in step 10 is added to each of current load values of links and buffers forming a path to be set for the call. In step 12, a determination is made as to whether or not each of the results of addition lies within the maximum load condition of the links and buffers. When they lie within the maximum load condition, the call is accepted in step 13. When they exceed the maximum load condition, the call is rejected in step 14.

Figures 7A, 7B:
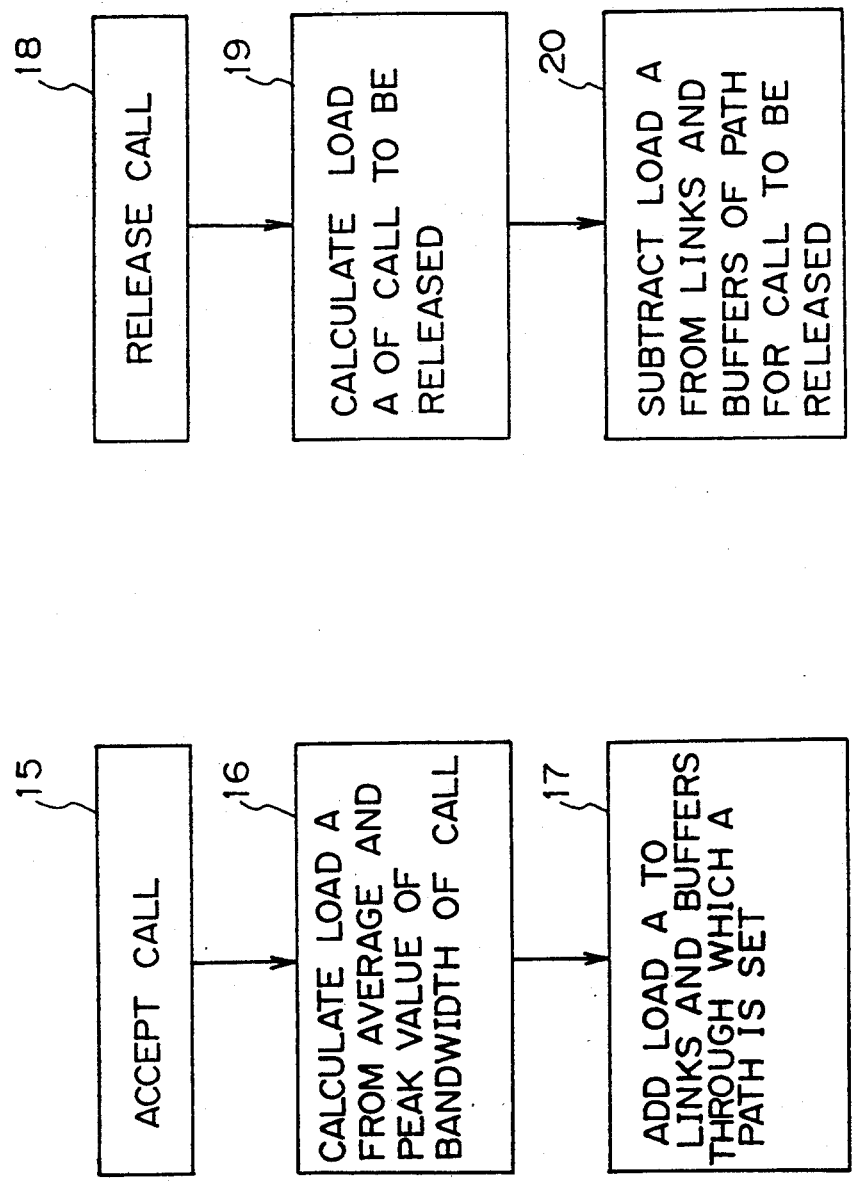
FIG. 7A and 7B are flowcharts of the process of management of the, switched network.

FIG. 7 is flowcharts of a management process of the switched network. FIG. 7A is a flowchart of a call-acceptance process. When a call is accepted in step 15, the load A is calculated from the average value and peak value of bandwidth of the call in step 16. In step 17, the load A calculated in step 16 is added to each of current load values of links and buffers forming a path for the call.

FIG. 7B is a flowchart when the call is released. When the call is released in step 18, the load A of a call to be released is calculated in step 19. In step 20, the load A calculated in step 19 is subtracted from each of the current loads of links and buffers forming a path for the call released.

Figure 8:
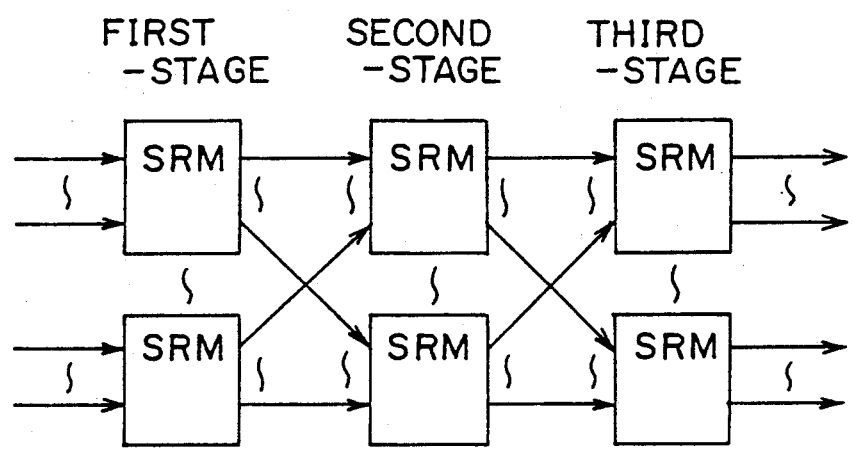
FIG. 8 is a block diagram of a multi-stage self-routing section (MSSR)

FIG. 8 is a block diagram illustrating a configuration of multi-stage self-routing section (MSSR) in which self-routing modules (SRM) are connected in cascade in the ATM switch. In the ATM switching device, switching is made to output an ATM cell entered from an input line to a specific output line. For this reason, an input line and an output line are specified for a call. In the configuration of the MSSR of FIG. 8, the routes of the second-stage SRM have a degree of freedom to set a path, and the routes of input lines of the first stage and output lines of the third stage are fixed.

In the present invention, a route in the SRM is set not simply but a route with sufficient room of loads is set based on the current loads of the input links, output links and buffers and the loads of the call passing through the set route. This route selection is made using the degree of freedom of the second SRM in the MSSR section. In an MSSR equipped with more than four SRMs as well, the same procedure is used.

Figure 9:
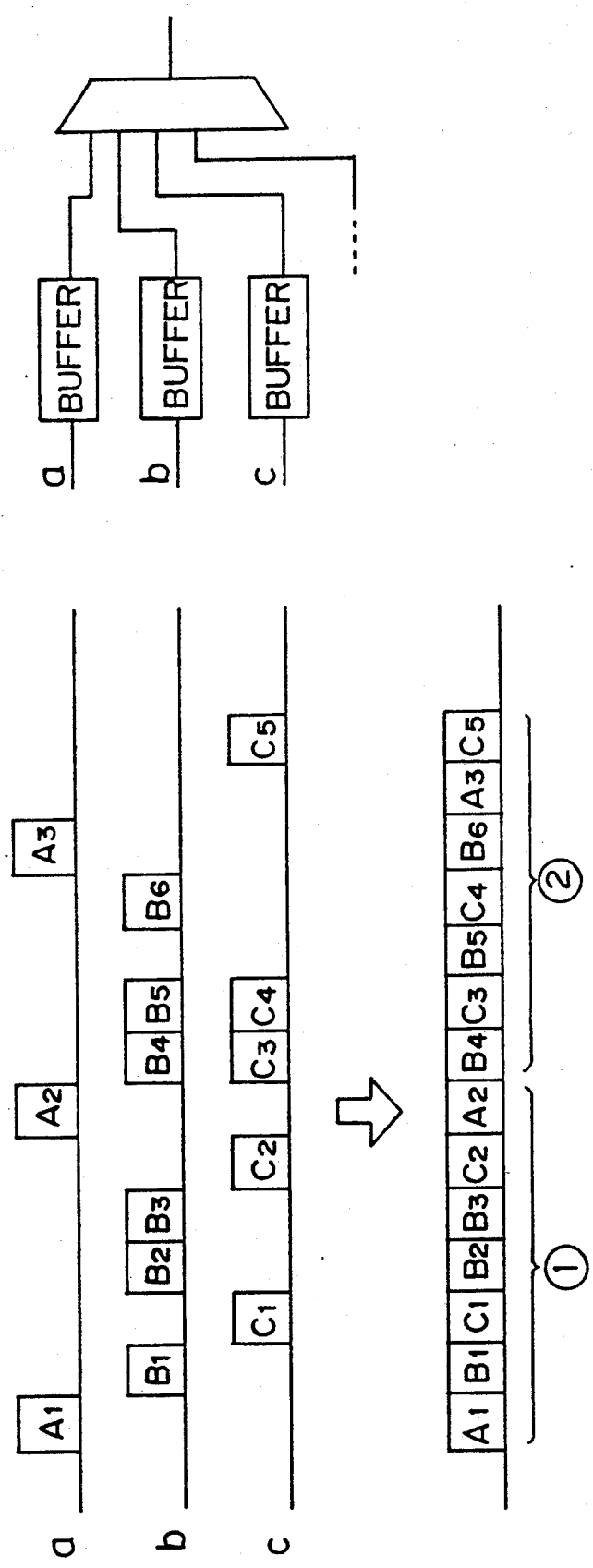
FIG. 9 illustrates a method of setting a coefficient $K_2$ based on delay conditions and a coefficient $K_3$ based on discard conditions.

FIG. 9 is a diagram illustrating a method of setting a coefficient $K_2$ depending on the delay conditions and a coefficient $K_3$ depending on the discard conditions. Those values are determined experimentally. In the self-routing module (SRM) of the ATM cell, when data are entered from input links a, b and c to three buffers connected to a selector for an output link, no delay occurs at the stage of (1), but a delay occurs at the stage of (2).

In such a case, in the present invention, when data on the link b is a motion picture, for example, and strict with delay conditions, the load is multiplied by, for example, 1.5 so that the call on the link c is not accepted and the delay of the call on the link b is eliminated. Alternatively, the load of the call on the link b is multiplied by 1.5 so that it is only the call of small bandwidth on the link a that is accepted later and the delay conditions of the call on the link b are kept. For this reason, the coefficient $K_2$ depending on the delay conditions of the call on the link b is set at 1.5.

Cells are abandoned when the buffer capacity is exceeded because peak values of bit rates of burst data input from a plurality of input links increase simultaneously during a fixed period. Thus, for calls which are strict with the conditions of abandonment the setting of the coefficient $K_3$ depending on the abandonment conditions the setting of the path are performed so that no abandonment of cells may occur by making the load depending on variations of data larger than actual and increasing the degree of occupation of the path by the call for the path set for the call.

Figure 10:
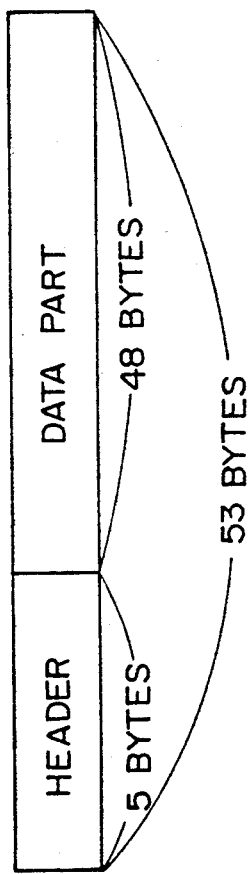
FIG. 10 illustrates an embodiment of an ATM cell.

FIG. 10 illustrates an embodiment of the ATM cell. The ATM cell is comprised of a header which indicates the destination of the cell and is five bytes long and a data part which is 48 bytes long. Thus, the length $n_c$ of the cell is $53 \times 8 = 424$ bits.

Next, the way of obtaining the load of a call will be described taking a call for transmitting continuous information by way of example. Assuming the bandwidth of the continuous information to be 45 $M_p$, both the average value $N_a$ and the peak value $N_p$ of the bit rate become 45 $M_{bps}$. Assuming the speed of a link in the switch to be 1.2 Gbps, the number $n_i$ of cells which can be transmitted over the link becomes the ratio of the cell length $n_c = 424$ bits to the link speed $N_i = 1.2$ Gbps, i.e., $2.8 \times 10^6$.

Since the time-varying term in equation (4) becomes 0, the load A for the call contains only a time-independent term. This term is obtained using equation (13) and the load A becomes about 0.04.

Figure 11:
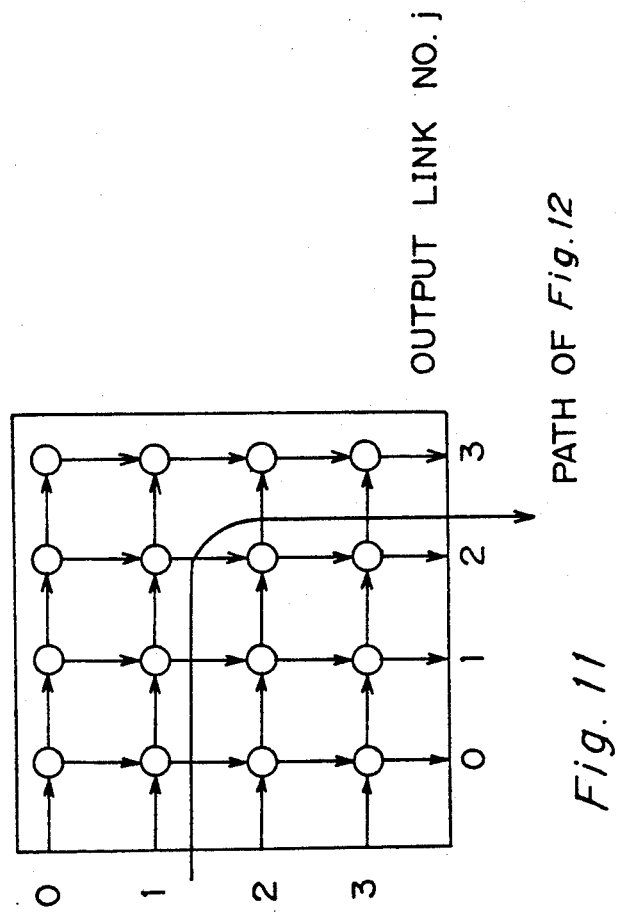
FIG. 11 is a conceptual diagram of a call control table.

FIG. 11 is a conceptual diagram of the call control table 9 in FIG. 3, that is, the table for storing current load values for links and buffers of the self-routing module (SRM) forming the ATM switch 5. In FIG. 4 the SRM has n input links and n output links, while, in FIG. 11, the SRM has four input links and four output links. Since a buffer is placed at each of intersections of the input links and output links, the call control table is configured to indicate loads for the links and the buffers.

Figure 12:
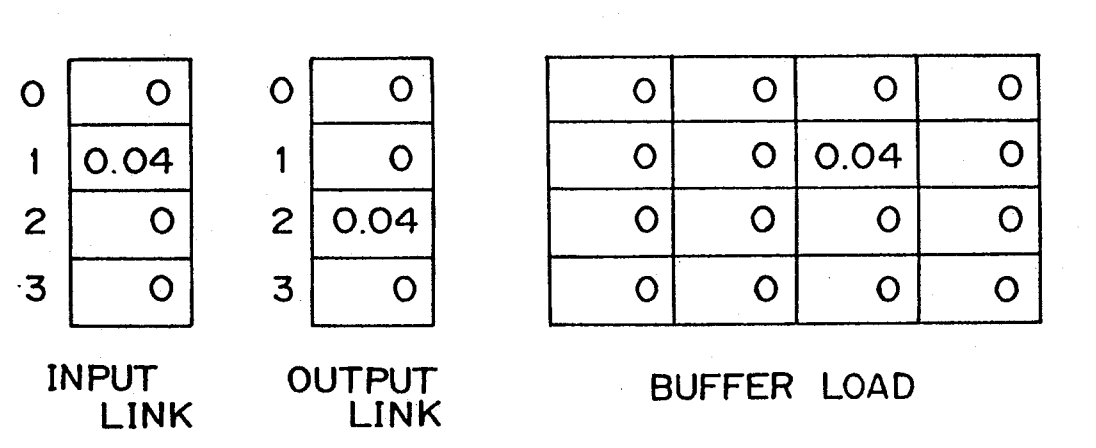

FIG. 12 illustrates the contents of the call control table when the path for a call having a load A of 0.04 is set from the input link No. 1 to the output link No. 2 in FIG. 11. In the Figure, a load for each of the input links, output links and buffers is stored. In FIG. 11, it is assumed that loads each for a link between buffers are stored in the table. In the case where a call control table is provided for each SRM, the load between buffers will never exceed that of an input link or output link connected to the buffers. Thus, if a determination is made, in step 12 of FIG. 6, as to whether or not the load of an input link or output link exceeds the maximum value, the determination of a load of a link between buffers need not be made.

FIG. 13 illustrates the contents of the call control table when a plurality of calls are accepted. The loads for plural calls are calculated and added to the call control table of FIG. 12, thereby obtaining such contents as shown in FIG. 13.

FIG. 14 illustrates the contents of the call control table for explanation of acceptance of a new call. In FIG. 13 consider a case where a new call whose load is 0.35 is accepted. When the new call is entered via the input link No. 0, the load of the input link becomes more than 1 so that the acceptance of the call is rejected. When the new call is entered via the input link No. 1 and output via the output link NO. 1, the load of the output link exceeds 1. Thus, the acceptance of the call is rejected. On the other hand, when the new call is entered via the input link No. 1 and output via the output link No. 2, the load of the buffer placed at the intersection of the input and output links is calculated and found to be less than 1. Thus, the call is accepted and the path is set.

As described above in detail, the present invention can be applied to an ATM communication which handles not only voice and low-speed data but also high-speed data such as motion images and control calls for different types of information in accordance with the same control procedure, thereby improving communications quality in an ATM network.

What is claimed is:

1. In an ATM switch which is used in an asynchronous transmission mode (ATM) digital network for providing various services including voice, data communications and motion images and comprises a plurality of self-routing modules each comprising a plurality of input links, a plurality of output links and buffers placed at respective intersections of said input links and said output links for storing ATM cells, a call control method comprising the steps of:

obtaining, when a call to be switched in said ATM switch is produced, a load representing how much of the capacity of said input and output links of said self-routing modules is used by said call from the average value and peak value of the bandwidth of said call;

adding said load to each of current load values of input links, output links and buffers of said self-routing modules which form a path set for said call in said ATM switch;

making a determination of whether or not each of the results of said addition exceeds a maximum value of said input links, said output links and said buffers forming said path; and accepting said call when said maximum is not exceeded as a result of said determination.

2. The call control method according to claim 1, in which switching of ATM cells in self-routing modules of said ATM switch is controlled by a call processor, and said call processor is provided with a call control table for each of said self-routing modules, said call control table storing current load values of said input links, said output links and said buffers of a corresponding self-routing module.

3. The call control method according to claim 1, in which, as the sum of loads of a plurality of calls entered into one input link of said self-routing module, the load of said one link is obtained.

4. The call control method according to claim 1, in which, as the sum of loads of a plurality of calls output from one output link of said self-routing module, the load of said one output link is obtained.

5. The call control method according to claim 1, in which, as the sum of loads of all of buffers connected to one output link of said self-routing module, the load of said one output link is obtained.

6. The call control method according to claim 1, in which buffers for storing ATM cells to be output to an output link of said self-routing module, are connected to said output link through a selector, and said selector sequentially selects said buffers to output said ATM cells to said output link and skips over buffers which store no ATM cell.

7. The call control method according to claim 1, in which the load of said call is obtained as the sum of a constant term which is proportional to the average value of bit rates of information of said call and does not vary with time and a variable term which is a function of difference between the peak value and the average value of the bit rates and varies with time.

8. The call control method according to claim 7, in which the load of a call for transmitting information which is strict with delay conditions is obtained by multiplying each of said constant term and said variable term by the same constant which is greater than unity.

9. The call control method according to claim 7, in which the load of a call for transmitting information which is strict with conditions of abandonment is multiplying said variable term by a constant which is greater than unity.

10. The call control method according to claim 1, in which the load A of said call is obtained by $$A = K_2[K_1 N_{av} + K_3 f(N_{av} - N_p)]$$

where $N_{av}$ is the average value of the bit rate of information of said call, $N_p$ is the peak value of the bit rate, $K_1$ is a load coefficient depending on the bandwidth of the information, $K_2$ is a coefficient depending on conditions of delay of the information, $K_3$ is a coefficient depending on conditions of abandonment of the information and $f(x)$ is a load function of variations of the information.

11. The call control method according to claim 7, in which for a call for transmitting continuous information, the constant term is obtained by dividing the number of ATM cells to be transmitted for a second which is given as the ratio of the bit rate of said call and the length of one ATM cell which is the number of bits of the cell by the number of cells which can be transmitted over a link for a second and which is given as the ratio of the speed of information in the link and the length of the ATM cell, and said variable term is set at zero.

12. The call control method according to claim 10, in which for a wall for transmitting continuous information, the load coefficient $K_1$ depending on the bandwidth of said information is obtained by $$K_1 = 1/(n_c \cdot n_i)$$

where $N_a$ is the bit rate of said information, $n_c$ is the length of an ATM cell and $n_i$ is the number of ATM cells which can be transmitted over a link for a second, and in which the bit rate $N_a$ of said information is made to be $N_{av}$, the load function f(x) depending on variations of said information is made to be zero and the coefficient $K_2$ depending on delay conditions is set at unity.

13. The call control method according to claim 1, in which for a call for transmitting continuous information, the load of each buffer in said self-routing module is obtained by the sum of loads of one or more calls passing through said buffer.

14. The call control method according to claim 1, in which the conditions under which no ATM cell is discarded at an output link is that the sum of loads of buffers connected to said output link of said self-routing module is equal to or smaller than the ratio of the number of cells which can be output from said output link for a second and the number of cells which can be transmitted over said input link for a second.

15. The call control method according to claim 7, in which for a call for transmitting burst information, said constant term is obtained by dividing the number of ATM cells to be transmitted for a second which is given as the ratio of the average value of the bit rate of said call and the length of an ATM cell by the number of cells which can be transmitted over a link for a second which is given as the ratio of the speed of the link and the ATM cell length, and in which for the peak value of the bit rate, the number of cells to be transmitted for a second which is given as the ratio of the peak value of the bit rate and the ATM cell length is divided by the number of cells which can be transmitted over a link for a second, a difference between the result of the division and the constant term is multiplied by a time function representing the burst nature of the burst information depending on causes including a compressing method, the ratio of the number of cells which can be stored in the buffer and the number of cells which can be transmitted over said link for a second is subtracted from the result of the multiplication, and the result of the subtraction is made to be the minimum value of said variable term.

16. The call control method according to claim 7, in which for a call for transmitting burst information, said variable term $A_{ijd}$ and said constant term $A_{ijm}$ are obtained by $$A_{ijd} \geq \left( \frac{n_p}{n_i} - \frac{n_a}{n_i} \right) g(t) - \frac{n_b}{n_i}$$

and $$A_{ijm} = n_a/n_i$$

where $n_p$ is the ratio of the peak value $N_p$ of the bit rate of the burst information and the ATM cell length $n_c$, $n_a$ is the ratio of the average value $N_a$ of the bit rate and the cell length $n_c$, $n_i$ is the number of cells which can be transmitted on an input link for a second, $n_b$ is the number of cells which can be stored in a buffer, and g(t) is a function representing the burst nature of the burst information due to causes including a compressing method.

17. The call control method according to claim 1, in which for a plurality of calls for transmitting a plurality of pieces of burst information passing through the same buffer in said self-routing module, the number of ATM cells to be transmitted for a second which is given as the ratio of the average value of bits rates of said burst calls and the ATM cell length is divided by the number of cells which can be transmitted on a link for a second which is given the ratio of the speed of information in the link and the ATM cell length to obtain a constant term which does not vary with time, the constant term is added to said plurality burst calls, and in which for the peak value of the bit rate of each of said burst calls, the number cells to be transmitted for a second which is given as the ratio of the peak value of the bit rates and the ATM cell length is divided by the number of cells which can be transmitted on the link for a second, a difference between the result of the division and corresponding one of constant terms for said burst calls is multiplied by a time function representing the burst nature of the burst information due to causes including a compressing method, the results of the multiplication for said burst calls are summed, and in which the ratio of the number of cells which can be stored in the buffer and the number of cells which can be transmitted on the link for a second is subtracted from the sum of said sum and the result of the addition to thereby obtain the load of the buffer.

18. The call control method according to claim 1, in which for each of p pieces of burst information passing through the same buffer in the self-routing module, by the use of the ratio $n_a$ of the average value Na of the bit rate of the burst information and the ATM cell length $n_c$, the ratio $n_p$ of the peak value $N_p$ of the bit rate and the cell length $n_c$, the number $n_i$ of cells which can be transmitted on an input link for a second, the number $n_b$ of cells which can be stored in a buffer and a time function g(t) representing the burst nature of the burst information due to causes including a compressing method, the load $A_{ij}$ of the buffer for said p pieces of burst information is given by $$A_{ij} = \sum_{a=1}^{p} A_{ijma} + \sum_{a=1}^{p} (A_{ijpa} - A_{ijma}) g(t) - A_{ijb}$$

where $A_{ijm}$ is the ratio of $n_a$ and $n_i$ for each of said p pieces of burst information, $A_{ijp}$ is the ratio of $n_p$ and $n_i$ and $A_{ijb}$ is the ratio of $n_b$ and $n_i$.

19. In an ATM switch which is used in an asynchronous transmission mode (ATM) digital network for providing various services including voice, data communications and motion images and comprises a plurality of self-routing modules each comprising a plurality of input links, a plurality of output links and buffers placed at respective intersections of said input links and said output links for storing ATM cells, a call control system comprising;

means for obtaining, when a call is made to said ATM switch, a load representing how much of the capacity of said input and output links of said self-routing modules is used by said call from the average value and peak value of the bandwidth of said call;

means for adding said load to each of current load values of input links, output links and buffers of said self-routing modules which form a path set for said call in said ATM switch;

means for making a determination of whether or not each of the results of said addition exceeds a maximum value of said input links, said output links and said buffers forming said path; and means for accepting said call when said maximum is not exceeded as a result of said determination.

20. The call control system according to claim 19, in which switching of ATM cells in self-routing modules of said ATM switch is controlled by a call processor, and said call processor is provided with a call control table for each of said self-routing modules, said call control table storing current load values of said input links, said output links and said buffers of a corresponding self-routing module.

* * * * *